US009989006B2

(12) United States Patent
Suzuki et al.

(10) Patent No.: US 9,989,006 B2
(45) Date of Patent: Jun. 5, 2018

(54) FUEL INJECTION CONTROL DEVICE AND FUEL INJECTION CONTROL METHOD FOR INTERNAL COMBUSTION ENGINE (71) Applicants: Ryo Suzuki, Toyota (JP); Takeshi Miyaura, Toyota (JP); Yoshiyasu Ito, Toyota (JP); Toyomori Tsuiki, Kariya (JP); Naoyuki Yamada, Kariya (JP)

(72) Inventors: Ryo Suzuki, Toyota (JP); Takeshi Miyaura, Toyota (JP); Yoshiyasu Ito, Toyota (JP); Toyomori Tsuiki, Kariya (JP); Naoyuki Yamada, Kariya (JP)

(73) Assignees: Toyota Jidosha Kabushiki Kaisha, Toyota-shi, Aichi-ken (JP); Denso Corporation, Kariya-shi, Aichi-ken (JP)

( * ) Notice: Subject to any disclaimer, the term of this patent is extended or adjusted under 35 U.S.C. 154(b) by 697 days.

(21) Appl. No.: 14/383,240

(22) PCT Filed: Mar. 5, 2013

(86) PCT No.: PCT/IB2013/000528
§ 371 (c)(1),
(2) Date: Sep. 5, 2014

(87) PCT Pub. No.: WO2013/132324
PCT Pub. Date: Sep. 12, 2013

(65) Prior Publication Data
US 2015/0019110 A1    Jan. 15, 2015

(30) Foreign Application Priority Data

Mar. 9, 2012   (JP) ................. 2012-053246

(51) Int. Cl.
*F02D 41/24*      (2006.01)
*F02D 41/40*      (2006.01)
*F02D 41/36*      (2006.01)

(52) U.S. Cl.
CPC ......... *F02D 41/36* (2013.01); *F02D 41/2467* (2013.01); *F02D 41/40* (2013.01); *F02D 2200/0602* (2013.01); *Y02T 10/44* (2013.01)

(58) Field of Classification Search
CPC ...... F02D 41/36; F02D 41/2467; F02D 41/40; F02D 2200/0602; Y02T 10/44
See application file for complete search history.

(56) References Cited

U.S. PATENT DOCUMENTS 6,161,511 A    12/2000  Hashimoto
6,401,703 B1 *  6/2002  Mamiya ............... F02D 31/008
                                               123/295

(Continued)

FOREIGN PATENT DOCUMENTS

DE       10241146 A1    8/2003
DE     102010017368 A1   12/2010
(Continued)

OTHER PUBLICATIONS

Notification of Reason(s) for Refusal for Jp Patent Appl. No. 2012-053246.

*Primary Examiner* — David Hamaoui
(74) *Attorney, Agent, or Firm* — Finnegan, Henderson, Farabow, Garrett & Dunner LLP (57) ABSTRACT An electronic control unit detects a manner of fluctuation of a fuel pressure with injection of fuel by a fuel injection valve with the use of a fuel pressure sensor, and calculates a tendency of deviation of an actual fuel injection characteristic of the fuel injection valve with respect to a basic fuel injection characteristic on the basis of a result of comparison between a detected temporal waveform and a basic temporal waveform. The tendency of deviation is reflected at a predetermined reflection rate (R) at the time of updating a learned value (Gij) for compensating for an individual difference of the fuel injection valve. The predetermined (Continued)

reflection rate (R) is increased when an accumulated value (D) of a vehicle travel distance is shorter than a predetermined value (Dth) as compared with when the accumulated value (D) is longer than or equal to the predetermined value (Dth).

10 Claims, 4 Drawing Sheets

(56) References Cited

U.S. PATENT DOCUMENTS

| | | | |
|---|---|---|---|
| 6,755,176 B2* | 6/2004 | Takeuchi | F02D 41/0085 123/299 |
| 7,269,500 B2* | 9/2007 | Cochet | F02D 41/1497 701/114 |
| 7,647,160 B2* | 1/2010 | Sugiyama | F02D 41/123 123/434 |
| 7,865,293 B2* | 1/2011 | Ishizuka | F02D 41/40 123/486 |
| 8,240,298 B2* | 8/2012 | Ishiwatari | F01N 3/22 123/674 |
| 8,306,719 B2* | 11/2012 | Ishizuka | F02D 41/2474 123/456 |
| 2003/0150428 A1* | 8/2003 | Hozuki | F02D 41/2416 123/486 |
| 2003/0164166 A1 | 9/2003 | Takeuchi et al. | |
| 2009/0055084 A1 | 2/2009 | Ishizuka et al. | |
| 2010/0192929 A1 | 8/2010 | Ishiwatari | |
| 2010/0324803 A1 | 12/2010 | Sugiyama et al. | |
| 2012/0323468 A1 | 12/2012 | Miyaura et al. | |

FOREIGN PATENT DOCUMENTS

| | | |
|---|---|---|
| JP | 60-153446 | 8/1985 |
| JP | 2000-303865 | 10/2000 |
| JP | 2003-254139 | 9/2003 |
| JP | 2005-248722 | 9/2005 |
| JP | 2007-231884 | 9/2007 |
| JP | 2009-52414 | 3/2009 |
| JP | 2010-174872 | 8/2010 |
| JP | 2011-190725 | 9/2011 |

* cited by examiner

FUEL INJECTION CONTROL DEVICE AND FUEL INJECTION CONTROL METHOD FOR INTERNAL COMBUSTION ENGINE

CROSS-REFERENCE TO RELATED APPLICATIONS

This application is a national phase application of International Application No. PCT/IB2013/000528, filed Mar. 5, 2013, and claims the priority of Japanese Application No. 2012-053246, filed Mar. 9, 2012, the content of both of which is incorporated herein by reference.

BACKGROUND OF THE INVENTION

1. Field of the Invention

The invention relates to a fuel injection control device and fuel injection control method that are applied to an internal combustion engine having a fuel injection valve that directly injects fuel into a cylinder in order to execute fuel injection control.

2. Description of Related Art

There is known a fuel injection control device for a diesel engine that includes fuel injection valves that directly inject fuel into corresponding cylinders (for example, see Japanese Patent Application Publication No. 2011-190725 (JP 2011-190725 A)). When each fuel injection valve is manufactured, there may occur an individual difference in injection characteristic. Therefore, before each fuel injection valve is assembled to a diesel engine, an initial value of a learned value (hereinafter, initial learned value) for compensating the individual difference of each fuel injection valve is preset through a test carried out with the use of a testing device. Specifically, the corresponding fuel pressure sensor is used to detect a manner of fluctuation of the fuel pressure inside each fuel injection valve with the injection of fuel by the fuel injection valve. And then the tendency of deviation of a temporal waveform of a fuel injection rate that is calculated from the detected manner of fluctuation of the fuel pressure (hereinafter, detected temporal waveform) with respect to a basic temporal waveform on the basis of the result of comparison between the detected temporal waveform and the basic temporal waveform. Then, the initial learned value for correcting a control value of each fuel injection valve is set on the basis of the tendency of deviation. By using the initial learned value in fuel injection control over the diesel engine, an individual difference of each fuel injection valve at the time of manufacturing is compensated, and fuel injection is accurately carried out through each fuel injection valve.

On the other hand, the injection characteristic of each fuel injection valve varies due to aged deterioration through engine operation. Then, the fuel injection control device described in JP 2011-190725 A includes the fuel pressure sensor that detects a fuel pressure inside the corresponding fuel injection valve provided in each cylinder, calculates the above-described detected temporal waveform from the detected value of the fuel pressure sensor during engine operation, and calculates the tendency of deviation of the detected temporal waveform with respect to the above-described basic temporal waveform from the result of comparison between the detected temporal waveform and the basic temporal waveform. Then, the learned value for correcting the control value of each fuel injection valve is updated on the basis of the tendency of deviation (hereinafter, learned value updating process). By executing such learned value updating process, even when there occurs an individual difference due to aged deterioration in each fuel injection valve, fuel injection is accurately carried out through each fuel injection valve.

When a detected value of the corresponding fuel pressure sensor has suddenly varied through, for example, superimposition of noise due to disturbance, if the tendency of deviation, which is calculated from the result of comparison between the detected temporal waveform and the basic temporal waveform, is directly used to update a learned value, the learned value may be updated to an inappropriate value. Then, the tendency of deviation is reflected at a predetermined reflection rate at the time of updating the learned value, and the learning rate of the learned value is decreased by reducing the predetermined reflection rate. By so doing, even when a detected value of the corresponding fuel pressure sensor has suddenly varied, the learned value is updated to an appropriate value.

When an initial learned value is calculated through a test carried out with the use of the testing device before each fuel injection valve is assembled to a diesel engine, an environment in which each fuel injection valve is placed may be different between the testing device and an actual diesel engine. Therefore, even if an initial learned value having a high reliability is set through a test carried out with the use of the testing device, the initial leaned value may not always be an appropriate value by which it is possible to compensate for the individual difference of each fuel injection valve in a state where the fuel injection valve is assembled to an actual diesel engine. In the above-described fuel injection control device, the learning rate of the learned value is decreased. Therefore, it may not be possible to update a learned value to an appropriate value within an ordinary test operation period in which test operation for a diesel engine is carried out in a manufacturing factory or a maintenance factory, and it may be necessary to extend the test operation period.

The above-described possibility not only applies to a fuel injection control device for a diesel engine but also mostly commonly applies to a fuel injection control device for a gasoline engine that includes a fuel injection valve that directly injects fuel into a cylinder. In addition, it is not limited to a configuration that an initial learned value is preset for each fuel injection valve, but it may also mostly commonly occur in a configuration that an initial learned value is not set.

SUMMARY OF THE INVENTION

The invention provides a fuel injection control device and fuel injection control method for an internal combustion engine, which are able to appropriately shorten a period immediately after a fuel injection valve is assembled and in which reliability of a learned value of the fuel injection valve is low while basically updating the learned value of the fuel injection valve to an appropriate value by decreasing a learning rate of the learned value.

A first aspect of the invention provides a fuel injection control device for an internal combustion engine that includes a fuel injection valve that directly injects fuel into a cylinder and a fuel pressure sensor that detects a fuel pressure inside the fuel injection valve or in a system that supplies fuel to the fuel injection valve. The fuel injection control device includes a controller configured to execute a learned value updating process, the learned value updating process updating a learned value for compensating for an individual difference of the fuel injection valve at a predetermined learning rate on the basis of the fuel pressure that is detected by the fuel pressure sensor. The controller is configured to execute the learned value updating process by increasing a learning rate of the learned value when an accumulated value of the number of updates of the learned value after the fuel injection valve is assembled to the internal combustion engine is smaller than a predetermined value as compared with when the accumulated value is larger than or equal to the predetermined value.

With the above configuration, when the accumulated value of the number of updates of the learned value after the fuel injection valve is assembled to the internal combustion engine in a manufacturing factory or a maintenance factory is smaller than the predetermined value, the learned value for compensating for the individual difference of the fuel injection valve is updated at a higher learning rate than usual. Therefore, a period during which the reliability of the learned value of the fuel injection valve is low is shortened.

In addition, after the accumulated value of the number of updates of the learned value becomes larger than or equal to the predetermined value, the learned value is updated at a usual learning rate. Therefore, even when it may not be possible to update the learned value to an appropriate value if the learning rate of the learned value is increased, for example, when a detected value of the fuel pressure sensor has suddenly varied, it is possible to update the learned value of the fuel injection valve to an appropriate value.

Thus, according to the invention, it is possible to appropriately shorten a period immediately after the fuel injection valve is assembled and in which reliability of the learned value of the fuel injection valve is low while basically updating the learned value of the fuel injection valve to an appropriate value by decreasing the learning rate of the learned value.

In the fuel injection control device, the controller may be configured to execute the learned value updating process by calculating a tendency of deviation of an actual fuel injection characteristic of the fuel injection valve with respect to a basic fuel injection characteristic of the fuel injection valve on the basis of the fuel pressure that is detected by the fuel pressure sensor, reflecting the tendency of deviation at a predetermined reflection rate at the time of updating the learned value, and increasing the predetermined reflection rate when the accumulated value of the number of updates of the learned value is smaller than the predetermined value as compared with when the accumulated value is larger than or equal to the predetermined value.

With the above configuration, in the learned value updating process, the tendency of deviation of the actual fuel injection characteristic of the fuel injection valve with respect to the basic fuel injection characteristic of the fuel injection valve is calculated on the basis of the fuel pressure that is detected with the use of the fuel pressure sensor. At the time of updating the learned value, the tendency of deviation is reflected at the predetermined reflection rate. Here, the learning rate of the learned value is increased as the predetermined reflection rate is increased; whereas the learning rate of the learned value is decreased as the predetermined reflection rate is reduced. Thus, by changing the predetermined reflection rate, it is possible to simply and accurately change the learning rate of the learned value.

In the fuel injection control device, the controller may be configured to execute the learned value updating process by detecting a manner of fluctuation of the fuel pressure with injection of fuel by the fuel injection valve with the use of the fuel pressure sensor and calculating the tendency of deviation on the basis of a result of comparison between a basic temporal waveform and a detected temporal waveform that is a temporal waveform of a fuel injection rate that is calculated from the detected manner of fluctuation of the fuel pressure.

In the fuel injection control device, the controller may provide the learned value separately for each of a plurality of engine operating regions, and the controller may be configured to execute the learned value updating process by updating the learned value in a first engine operating region on the basis of the learned value in a second engine operating region different from the first engine operating region, on the condition that the accumulated value of the number of updates of the learned value becomes a reference value, the number of updates of the learned value in the first engine operating region is smaller than or equal to a first predetermined number of times and the number of updates of the learned value in the second engine operating region is larger than or equal to a second predetermined number of times larger than the first predetermined number of times.

With the configuration that the learned value is separately provided for each of the plurality of engine operating regions, when the accumulated value of the number of updates of the learned value after the fuel injection valve is assembled to the internal combustion engine becomes the reference value, the reliability of the learned value varies among the engine operating regions. That is, in an engine operating region in which engine operation is not carried out for a sufficient period of time, the corresponding learned value is not sufficiently updated, so the reliability of that learned value decreases. On the other hand, in an engine operating region in which engine operation is carried out for a sufficiently long period of time, the corresponding learned value is frequently updated, so the reliability of that learned value increases.

With the above configuration, when the accumulated value of the number of updates of the learned value becomes the reference value, in the case where the number of updates of the learned value in the engine operating region is smaller than or equal to the first predetermined number of times and the number of updates of the learned value in an engine operating region different from the engine operating region is larger than or equal to the second predetermined number of times, the learned value in the engine operating region is updated on the basis of the learned value in the different engine operating region. Therefore, the learned value in the corresponding engine operating region is updated on the basis of the learned value in the different engine operating region having a higher reliability. Thus, even when there is an engine operating region for which engine operation is not carried out so much at the time point at which the accumulated value of the number of updates of the learned value becomes the reference value, it is possible to update the learned value in the engine operating region to an appropriate value.

To update the learned value in each of the engine operating regions to appropriate values at the time point at which the accumulated value of the number of updates of the learned value after the fuel injection valve is assembled to the internal combustion engine becomes the predetermined value, it is desirable to set the reference value to at or below the predetermined value.

In the fuel injection control device, the controller may be configured to execute the learned value updating process by updating the learned value in the first engine operating region with the learned value in the second engine operating region adjacent to the first engine operating region, on the condition that the accumulated value of the number of updates of the learned value becomes the reference value, the number of updates of the learned value in the first engine operating region is smaller than or equal to the first predetermined number of times and the number of updates of the learned value in the second engine operating region is larger than or equal to the second predetermined number of times.

The learned value has a different value depending on the engine operating region; however, the learned value in an engine operating region and the learned value in an adjacent different engine operating region have relatively close values. With the above configuration, when the accumulated value of the number of updates of the learned value becomes the reference value, in the case where the number of updates of the learned value in the engine operating region is smaller than or equal to the first predetermined number of times and the number of updates of the learned value in the different engine operating region adjacent to the engine operating region is larger than or equal to the second predetermined number of times, the learned value in the engine operating region is updated with the learned value in the adjacent different engine operating region. Thus, it is possible to update the learned value of an engine operating region, for which engine operation has not been carried out so much at the time point at which the accumulated value of the number of updates of the learned value becomes the reference value, to an appropriate value in a simple manner.

In the mode in which the accumulated value of the number of updates of the learned value after the fuel injection valve is assembled to the vehicle-mounted internal combustion engine is estimated, the controller may be configured to estimate an accumulated value of the number of updates of the learned value on the basis of an accumulated value of a vehicle travel distance after the fuel injection valve is assembled to the internal combustion engine.

With the above configuration, in comparison with the configuration that the accumulated value of the number of updates of the learned value is separately calculated, by using an existing parameter, that is, the accumulated value of the vehicle travel distance, it is possible to reduce the processing load of the control device.

A second aspect of the invention provides a fuel injection control method for an internal combustion engine that includes a fuel injection valve that directly injects fuel into a cylinder. The fuel injection control method includes: updating a learned value for compensating for an individual difference of the fuel injection valve at a predetermined learning rate on the basis of a fuel pressure inside the fuel injection valve or in a system that supplies fuel to the fuel injection valve; and increasing the learning rate of the learned value when an accumulated value of the number of updates of the learned value after the fuel injection valve is assembled to the internal combustion engine is smaller than a predetermined value as compared with when the accumulated value is larger than or equal to the predetermined value.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an example embodiment in which the invention is implemented as a fuel injection control device for a vehicle-mounted diesel engine will be described with reference to FIG. 1 to FIG. 5. In the present embodiment, the four-cylinder diesel engine (hereinafter, simply referred to as internal combustion engine 10) is employed.

Figure 1:
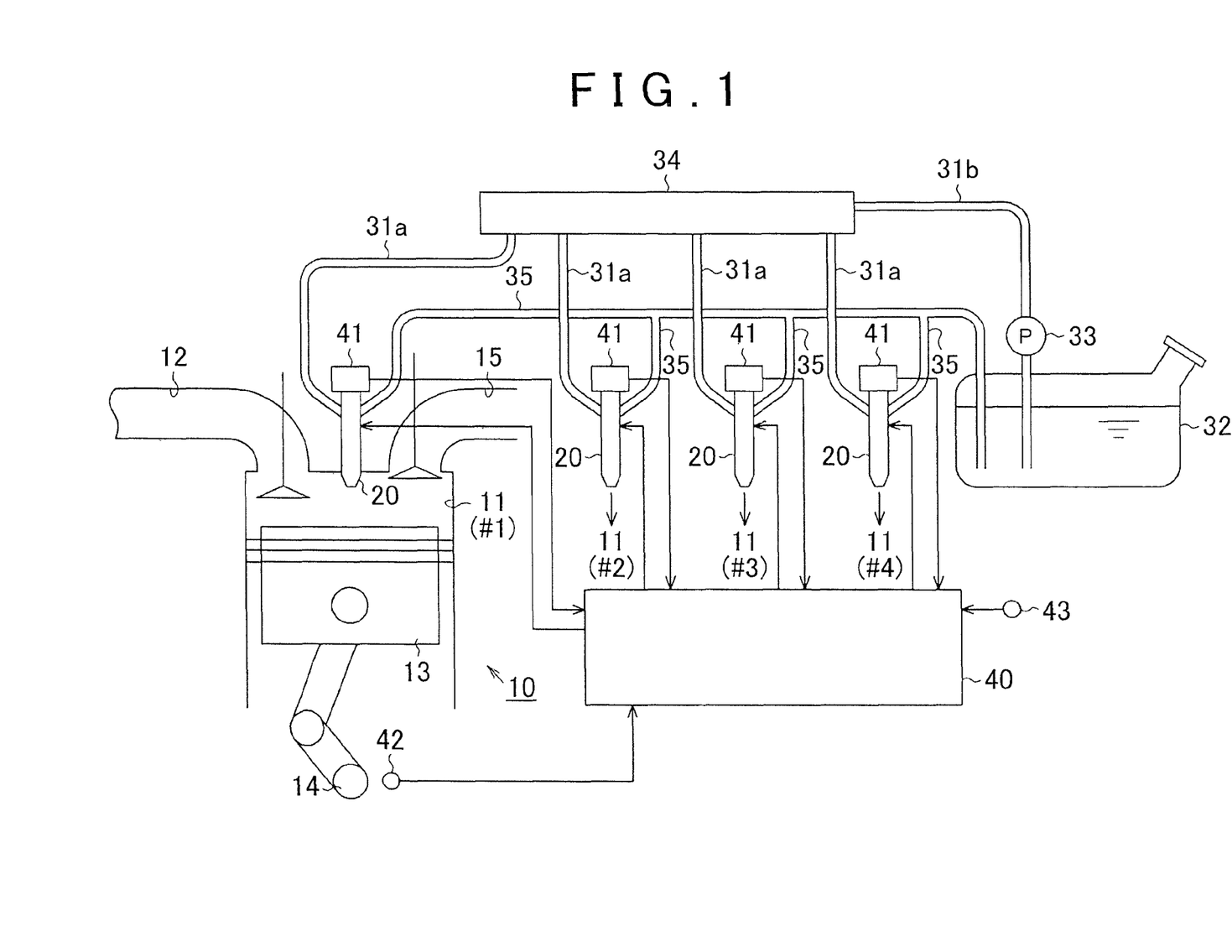
FIG. 1 is a schematic view that shows the schematic configuration of an electronic control unit that serves as a fuel injection control device for an internal combustion engine according to an embodiment of the invention and the schematic configuration of the internal combustion engine.

As shown in FIG. 1, the internal combustion engine 10 includes an intake passage 12 that is used to introduce air into cylinders 11. A fuel injection valve 20 is provided for each of the cylinders 11 (#1 to #4). Each fuel injection valve 20 directly injects fuel into a corresponding one of the cylinders 11. The internal combustion engine 10 injects fuel from each fuel injection valve 20 into air that is compressed into a high temperature with the upward movement of a corresponding one of pistons 13. By so doing, fuel is caused to carry out self-ignition and combust. The pistons 13 that move downward by the energy of combustion drive a crankshaft 14 to rotate. The crankshaft 14 is connected to the pistons 13. Burned exhaust gas is emitted through an exhaust passage 15.

Each fuel injection valve 20 is connected to a common rail 34 via a corresponding branch passage 31a. The common rail 34 is connected to a fuel tank 32 via a supply passage 31b. A fuel pump 33 is provided midway of the supply passage 31b. Fuel stored in the fuel tank 32 is drawn and fed toward the common rail 34 under pressure by the fuel pump 33, and is then stored in the common rail 34 in a pressurized state. The fuel stored in the common rail 34 is supplied to each fuel injection valve 20 through the corresponding branch passage 31a.

A return passage 35 is connected to each fuel injection valve 20. Each return passage 35 is used to return redundant fuel in the corresponding fuel injection valve 20 to the fuel tank 32. Such various controls over the internal combustion engine 10 are executed by an electronic control unit 40 (controller in the claims). The electronic control unit 40 is formed of a CPU (central processing unit), a ROM (read-only memory), a RAM (random access memory), and the like. The CPU executes arithmetic processing associated with various controls. The ROM stores programs and data for various controls. The RAM temporarily stores results of arithmetic processing, and the like. The electronic control unit 40 loads detection signals of various sensors, executes various arithmetic processing and comprehensively controls the internal combustion engine 10 on the basis of the results of the various arithmetic processing.

The various sensors include a fuel pressure sensor 41 provided for each fuel injection valve 20. Each fuel pressure sensor 41 detects a fuel pressure PQ inside the corresponding fuel injection valve 20. The various sensors further include a crank angle sensor 42, an accelerator operation amount sensor 43, and the like. The crank angle sensor 42 detects a crank angle CA that is a rotation angle of the crankshaft 14. The accelerator operation amount sensor 43 detects an accelerator operation amount ACCP that is an operation amount of an accelerator pedal.

The electronic control unit 40 executes various computations on the basis of signals that are output from the various sensors, and executes various controls over the internal combustion engine 10 on the basis of results of those computations. Specifically, the electronic control unit 40 calculates a target value of a fuel injection amount (target fuel injection amount TQ) and selects an injection pattern on the basis of the engine operating state (in the present embodiment, the accelerator operation amount ACCP and an engine rotation speed NE). Furthermore, the electronic control unit 40 calculates a target value of a fuel injection amount in each injection (main injection, pre-injection, after-injection, and the like) of the selected injection pattern on the basis of the target fuel injection amount TQ and the engine rotation speed NE. Each fuel injection valve 20 is actuated to open on the basis of these target values. The electronic control unit 40 calculates a target value of timing at which each injection is carried out, such as start timing of main injection and an interval between pre-injection and main injection (injection interval), in addition to the target values in the injections, such as main injection, pre-injection and after-injection. A target injection period TAU in each injection (pre-injection, main injection and after-injection) is corrected on the basis of the fuel pressure PQ that is detected by the corresponding fuel pressure sensor 41.

In the present embodiment, in synchronization with execution of the above fuel injection control, operation control over the fuel pump 33 (rail pressure control) is executed. The rail pressure control is executed in order to adjust the fuel pressure in the common rail 34 (rail pressure PR) to a magnitude based on the engine operating state. Specifically, a control target value of the rail pressure PR (target rail pressure Tpr) is calculated on the basis of the target fuel injection amount TQ and the engine rotation speed NE. Then, by controlling the operation of the fuel pump 33 such that an actual rail pressure PR coincides with the target rail pressure Tpr, the amount of fuel fed under pressure is adjusted. In the present embodiment, a higher one of the fuel pressure PQ in the first cylinder 11 (#1), detected by the corresponding fuel pressure sensor 41, and the fuel pressure PQ in the fourth cylinder 11 (#4), detected by the corresponding fuel pressure sensor 41, is employed as the above actual rail pressure PR.

As described above, there may occur an individual difference in injection characteristic when each fuel injection valve 20 is manufactured, so, in the present embodiment, before each fuel injection valve 20 is assembled to the internal combustion engine 10, an initial value of a learned value (hereinafter, initial learned value Giji) for compensating for the individual difference of each fuel injection valve 20 is preset through a test that is carried out with the use of a testing device.

Specifically, a manner of fluctuation of the fuel pressure PQ inside each fuel injection valve 20 with the injection of fuel by the corresponding fuel injection valve 20 is detected with the use of a fuel pressure sensor (which is a sensor that constitutes the testing device and that is different from the above-described fuel pressure sensors 41). The tendency of deviation of a temporal waveform of a fuel injection rate that is calculated from the detected manner of fluctuation of the fuel pressure PQ (detected temporal waveform) with respect to a basic temporal waveform on the basis of the result of comparison between the detected temporal waveform and the basic temporal waveform. The initial learned value Giji of each fuel injection valve 20 is set on the basis of the tendency of deviation.

Figure 2:
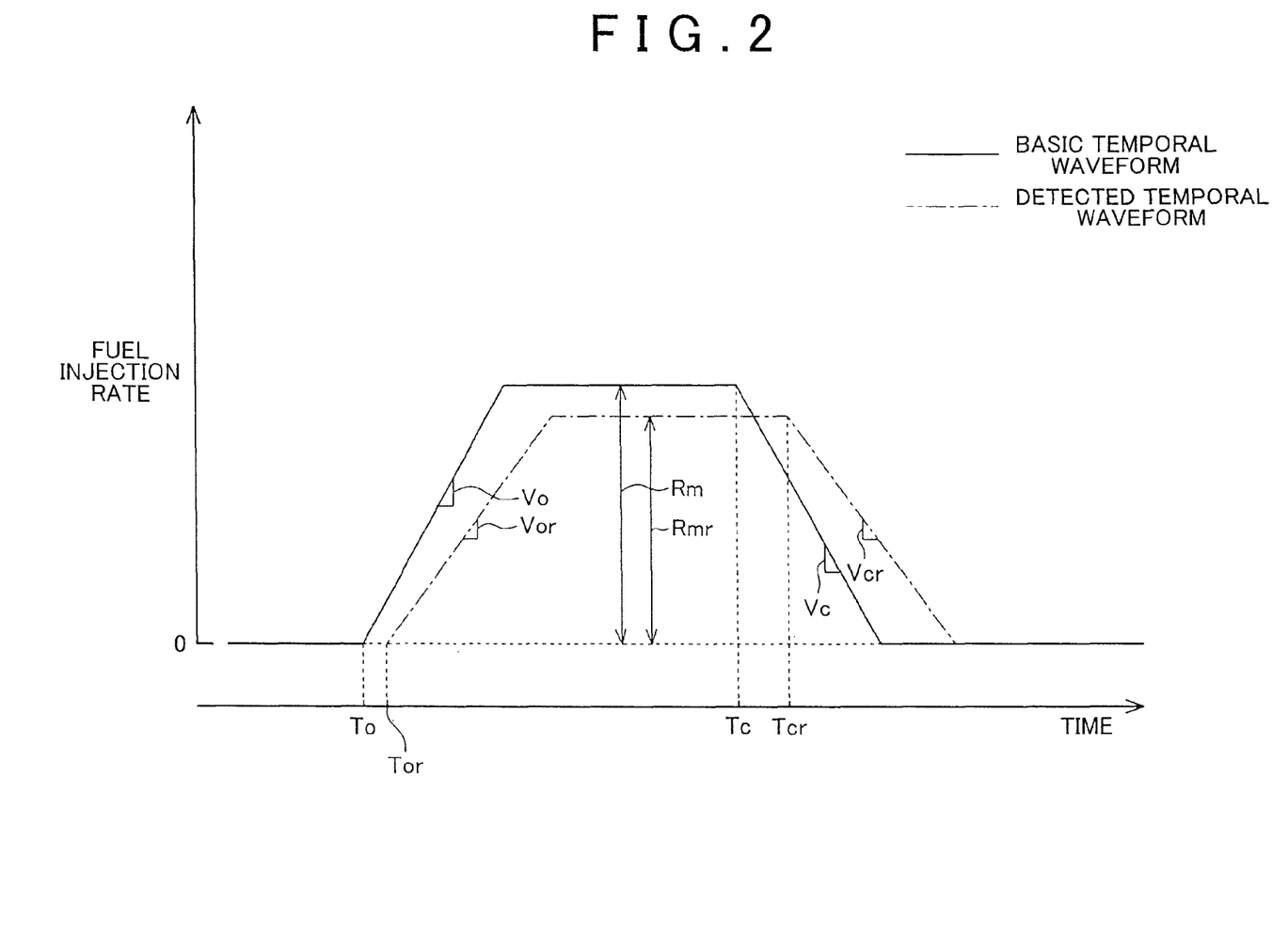
FIG. 2 is a time chart that shows an example of a detected temporal waveform and basic temporal waveform of a fuel injection rate in the embodiment.

Calculation of the initial learned value Giji will be described with reference to FIG. 2. FIG. 2 is a time chart that shows an example of the detected temporal waveform and basic temporal waveform of the fuel injection rate. At the time of calculating the initial learned value Giji, first, the basic temporal waveform of the fuel injection rate is calculated on the basis of various calculation parameters, such as a target fuel injection amount TQ, target injection timing, a fuel pressure PQ, a target injection amount of first-half injection among injections of the injection pattern and an injection interval. The correlation between an engine operating state and a basic temporal waveform appropriate for the engine operating state is set in advance through an experiment, simulation, or the like.

As indicated by the solid line in FIG. 2, the basic temporal waveform is set to a trapezoidal waveform that is defined by timing at which each fuel injection valve 20 starts opening (hereinafter, valve opening operation start timing To), a rate of increase in fuel injection rate after the fuel injection valve 20 starts opening (hereinafter, rate of increase in injection rate Vo), timing at which the fuel injection valve 20 starts closing (hereinafter, valve closing operation start timing Tc), a rate of decrease Vc in fuel injection rate after the fuel injection valve 20 starts closing, and a maximum value of the fuel injection rate (hereinafter, maximum fuel injection rate Rm).

On the other hand, as indicated by the alternate long and short dash line in FIG. 2, a temporal waveform of an actual fuel injection rate (detected temporal waveform) is calculated on the basis of the fuel pressure PQ that is detected with the use of the corresponding fuel pressure sensor. Specifically, on the basis of a manner of fluctuation of the fuel pressure PQ, the actual valve opening operation start timing Tor, actual rate of increase in injection rate Vor, actual valve closing operation start timing Tcr, actual rate of decrease in injection rate Vcr and actual maximum injection rate Rmr of the corresponding fuel injection valve 20 are calculated.

The basic temporal waveform and the detected temporal waveform are compared with each other, a difference in each parameter between these waveforms, that is, the tendency of deviation of the detected temporal waveform with respect to the basic temporal waveform, is calculated. Specifically, a difference ΔTog (=To−Tor) in valve opening operation start timing, a difference ΔVog (=Vo−Vor) in rate of increase in injection rate, a difference ΔTcg (=Tc−Tcr) in valve closing operation start timing, a difference ΔVcg (=Vc−Vcr) in rate of decrease in injection rate and a difference ΔRmg (=Rm−Rmr) in maximum injection rate are calculated. Then, the initial learned value Giji is calculated on the basis of these differences ΔTog, ΔVog, ΔTcg, ΔVcg and ΔRmg, and is stored in a memory that is incorporated in the corresponding fuel injection valve 20. After the fuel injection valve 20 is assembled to the internal combustion engine 10, the initial learned value Giji is stored in the electronic control unit 40.

Figure 3:
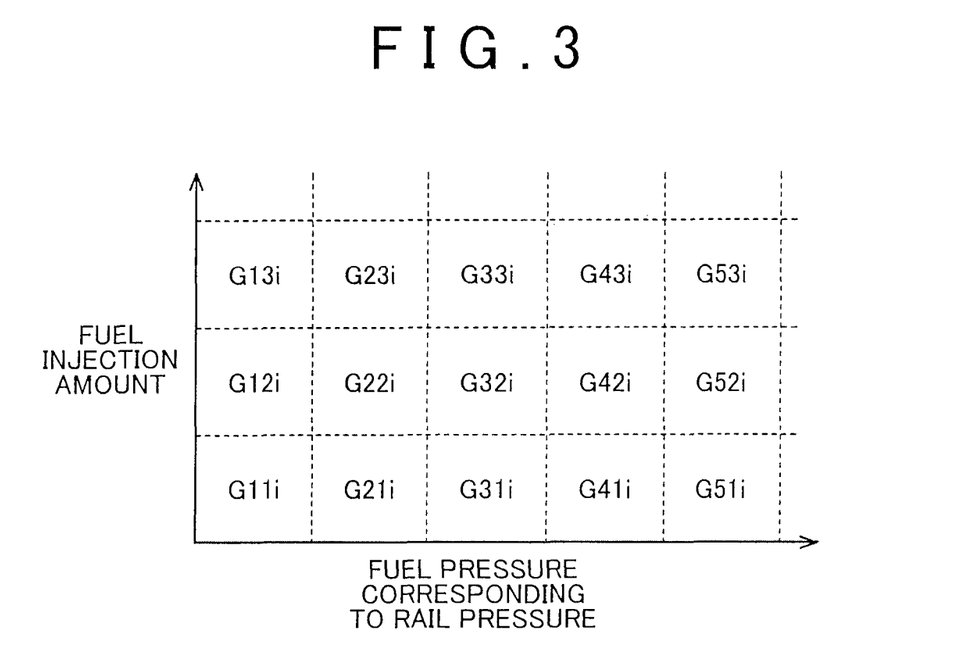
FIG. 3 is a map that shows the relationship between an engine operating region that is defined by a fuel pressure, corresponding to a rail pressure, and a fuel injection amount and an initial learned value of each fuel injection valve in the engine operating region in the embodiment.

As shown in FIG. 3, the above initial learned value Giji is provided separately for each of a plurality of engine operating regions defined by a fuel pressure, corresponding to the rail pressure PR of the above-described internal combustion engine 10, and a fuel injection amount, and is preset for each of the engine operating regions.

As described above, the injection characteristic of each fuel injection valve 20 varies due to aged degradation through engine operation. In the present embodiment, during engine operation, the above-described detected temporal waveform is calculated from the detected value of each fuel pressure sensor 41, and the differences ΔTog, ΔVog, ΔTcg, ΔVcg and ΔRmg in the parameters between the above-described waveforms, that is, the tendency of deviation of the detected temporal waveform with respect to the above-described basic temporal waveform, is calculated from the result of comparison between the detected temporal waveform and the basic temporal waveform. Then, a learned value Gij for correcting the control value of each fuel injection valve 20 is updated on the basis of the differences (learned value updating process).

Figure 4:
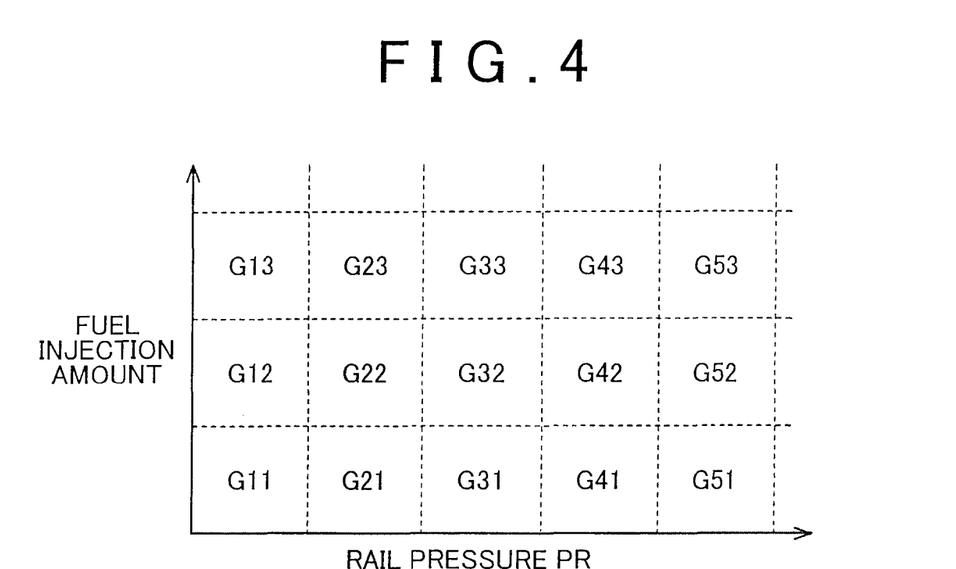
FIG. 4 is a map that shows the relationship between an engine operating region that is defined by a rail pressure and a fuel injection amount and a learned value of each fuel injection valve in the engine operating region in the embodiment.

As shown in FIG. 4, the learned value Gij is provided separately for each of a plurality of engine operating regions defined by a rail pressure PR of the internal combustion engine 10 and a fuel injection amount. The learned value Gij in each engine operating region is updated when the internal combustion engine 10 is operated in that engine operating region.

For example, when a detected value of the corresponding fuel pressure sensor 41 has suddenly varied through, for example, superimposition of noise due to disturbance, if the above-described differences (the tendency of deviation), which are calculated from the result of comparison between the detected temporal waveform and the basic temporal waveform, are directly used to update the learned value, the learned value may be updated to an inappropriate value. Then, in the present embodiment, the differences (the tendency of deviation) are reflected at a predetermined reflection rate at the time of updating the learned value Gij, and the learning rate of the learned value Gij is decreased by reducing the predetermined reflection rate. That is, the differences are moderately reflected on the learned value Gij. Specifically, the averages of the last n (for example, n=100) sets of differences calculated until the current control cycle, that is, values obtained by merely dividing the last n sets of differences by n, are used as the learned value Gij, in the current control cycle for update. By so doing, even when a detected value of the corresponding fuel pressure sensor 41 has suddenly varied, the learned value Gij is updated to an appropriate value.

In case that the initial learned value Giji is calculated through the test carried out with the use of the testing device before each fuel injection valve 20 is assembled to the internal combustion engine 10, an environment in which each fuel injection valve 20 is placed may be different between the testing device and the actual internal combustion engine 10. Therefore, even if the initial learned value Giji having a high reliability is set through the test carried out with the use of the testing device, the initial leaned value Giji may not always be an appropriate value by which it is possible to compensate for the individual difference of each fuel injection valve 20 in a state where the fuel injection valve 20 is assembled to the actual internal combustion engine 10. Moreover, as described above, because the learning rate of the learned value Gij is decreased, it may not be possible to update the learned value Gij to an appropriate value within an ordinary test operation period in which test operation for the internal combustion engine 10 is carried out in a manufacturing factory or a maintenance factory, and it may be necessary to extend the test operation period.

Then, in the learned value updating process according to the present embodiment, the learning rate of the leaned value Gij is increased when an accumulated value of the number of updates of the learned value Gij after the corresponding fuel injection valve 20 is assembled to the internal combustion engine 10 is smaller than a predetermined value as compared with when the accumulated value is larger than or equal to the predetermined value. Specifically, when an accumulated value of a vehicle travel distance (hereinafter, an accumulated value D of a vehicle travel distance) is shorter than a predetermined value Dth (20 km in the present embodiment), it is determined that the number of updates of the learned value Gij is smaller than the predetermined value, and the predetermined reflection rate R is increased as compared with when the accumulated value D is longer than or equal to the predetermined value Dth. By so doing, the learning rate of the learned value Gij is increased. Thus, the learned value Gij of the corresponding fuel injection valve 20 is updated to an appropriate value by basically decreasing the learning rate of the learned value Gij, and a period during which the reliability of the learned value Gij of the corresponding fuel injection valve 20 is low immediately after the fuel injection valve 20 is assembled is shortened.

Figure 5:
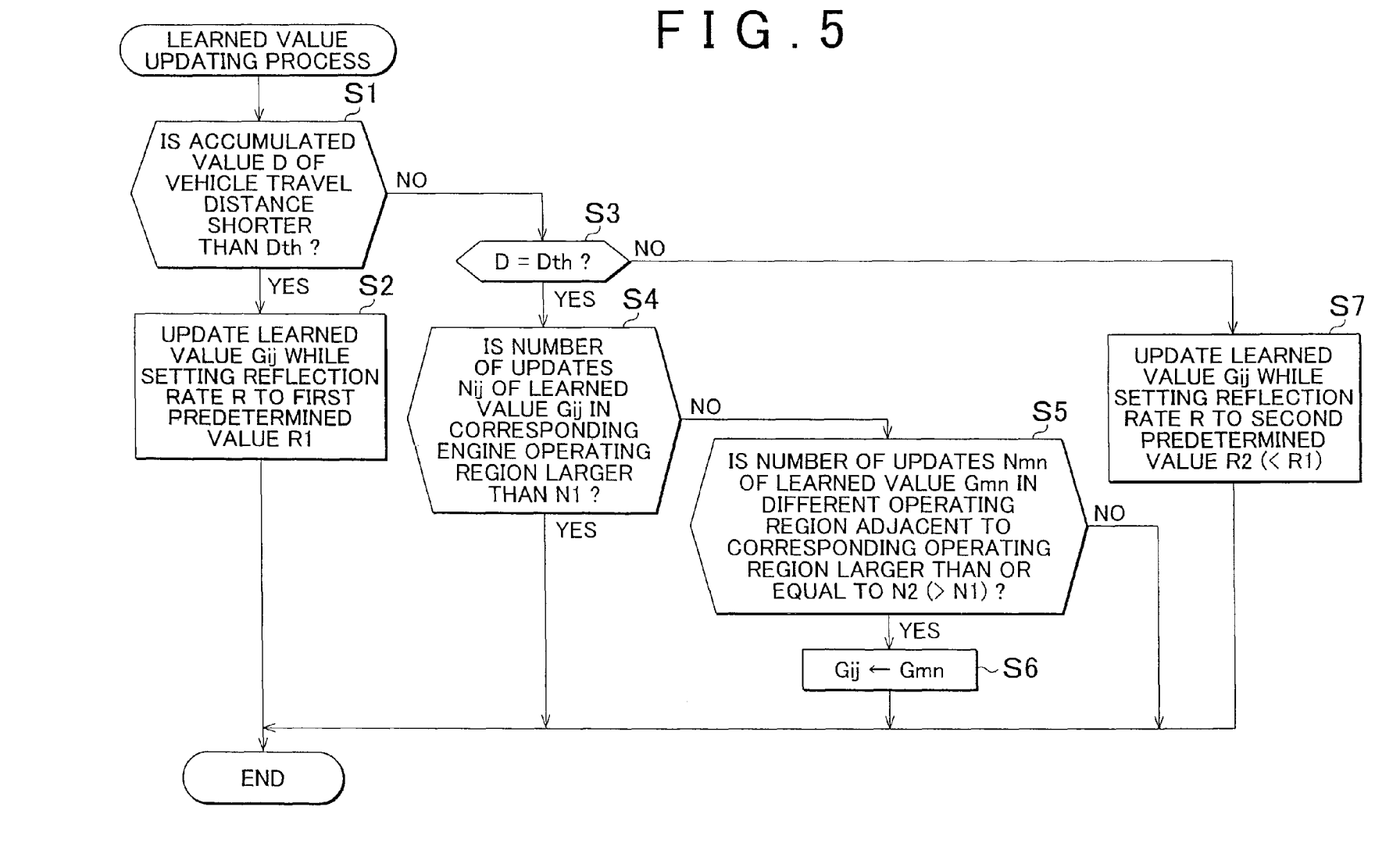
FIG. 5 is a flowchart that shows the procedure of a learned value updating process in the embodiment.

Next, the procedure of the learned value updating process according to the present embodiment will be described with reference to FIG. 5. The series of processes is repeatedly executed each time fuel injection is carried out in each cylinder 11 through the electronic control unit 40 during engine operation.

In the series of processes, first, it is determined whether the accumulated value D of the vehicle travel distance is shorter than the predetermined value Dth (step S1). When the accumulated value D of the vehicle travel distance is shorter than the predetermined value Dth (YES in step S1), the process subsequently proceeds to step S2. In step S2, a reflection rate R for the above-described differences (the tendency of deviation) at the time of updating the learned value Gij to a first predetermined value R1 (=0.03), and the learned value Gij in the engine operating region at that time is updated, after which the series of processes once ends. That is, by setting the reflection rate R to the first predetermined value R1, the averages of the last 33 sets of differences, including the differences in the current control cycle, are used as the learned value Gij in the current control cycle for update.

On the other hand, when the accumulated value D of the vehicle travel distance is longer than or equal to the predetermined value Dth (NO in step S1), the process subsequently proceeds to step S3. In step S3, it is determined whether the accumulated value D of the vehicle travel distance is the predetermined value Dth. Here, when the accumulated value D of the vehicle travel distance is the predetermined value Dth (YES in step S3), the process subsequently proceeds to step S4. In step S4, it is determined whether the number of updates Nij of the learned value Gij in the engine operating region at that time is larger than a first predetermined number of times N1 (30 times in the present embodiment). When the number of updates Nij is larger than the first predetermined number of times N1 (YES in step S4), it is determined that the reliability of the learned value Gij is high, after which the series of processes once ends.

On the other hand, when the number of updates Nij of the learned value Gij in that engine operating region is smaller than or equal to the first predetermined number of times N1 in step S4 (NO in step S4), the process subsequently proceeds to step S5. In step S5, it is determined whether the number of updates Nmn of a learned value Gmn in a different engine operating region adjacent to the engine operating region at that time is larger than or equal to a second predetermined number of times (100 times in the present embodiment) larger than the first predetermined number of times N1. When the number of updates Nmn is larger than or equal to the second predetermined number of times N2 (YES in step S5), it is determined that the learned value Gmn in the different engine operating region adjacent to the engine operating region at that time has a higher reliability than the learned value Gij in the engine operating region at that time, and the process subsequently proceeds to step S6. In step S6, the learned value Gmn is used as the learned value Gij in that engine operating region for update, after which the series of processes ends. Here, for example, as shown in FIG. 4, when the number of updates Nij of a learned value G31 (i=3, j=1) in the engine operating region at that time is smaller than or equal to the first predetermined number of times N1, and the number of updates Nmn of a learned value G41 (m=4, n=1) in a different engine operating region adjacent to the engine operating region at that time is larger than or equal to the second predetermined number of times N2, the value of G41 is directly used as G31 for update.

In step S5, when the number of updates Nmn of the learned value Gmn in a different engine operating region adjacent to the engine operating region at that time is smaller than the second predetermined number of times N2 (NO in step S5), the reliability of the learned value Gmn is also not so high, so the series of processes once ends.

On the other hand, in step S3, when the accumulated value D of the vehicle travel distance is longer than the predetermined value Dth (NO in step S3), the process subsequently proceeds to step S7. In step S7, learned value Gij is updated while the reflection rate R for the above-described differences at the time of updating the learned value Gij is set to a second predetermined value R2 (=0.01<R2) smaller than the first predetermined value R1, after which the series of processes once ends. That is, by setting the reflection rate R to the second predetermined value R2, the averages of the last one hundred sets of differences, including the differences in the current control cycle, are used as the learned value Gij in the current control cycle for update.

Next, the operation of the present embodiment will be described. When the accumulated value D of the vehicle travel distance after each fuel injection valve 20 is assembled to the internal combustion engine 10 in a manufacturing factory or a maintenance factory is shorter than the predetermined value Dth, that is, when the accumulated value of the number of updates of the learned value Gij is smaller than the predetermined value, the learned value Gij of each fuel injection valve 20 is updated at a higher learning rate than usual. Therefore, a period during which the reliability of the learned value Gij of each fuel injection valve 20 is low is shortened.

After the accumulated value D of the vehicle travel distance becomes longer than or equal to the predetermined value Dth, that is, after the accumulated value of the number of updates of the learned value Gij becomes larger than or equal to the predetermined value, the learned value Gij is updated at a usual learning rate. Therefore, even when it may not be possible to update the learned value Gij to an appropriate value if the learning rate of the learned value Gij is increased, for example, when a detected value of the corresponding fuel pressure sensor 41 has suddenly varied, it is possible to update the learned value Gij of the corresponding fuel injection valve 20 to an appropriate value.

With the configuration that the learned value Gij is separately provided for each of the plurality of engine operating regions, when the accumulated value D of the vehicle travel distance after each fuel injection valve 20 is assembled to the internal combustion engine 10 becomes the predetermined value Dth (reference value), the reliability of the learned value Gij varies among the engine operating regions. That is, in an engine operating region in which engine operation is not carried out so much, the corresponding learned value Gij is not sufficiently updated, so the reliability of that learned value Gij decreases. On the other hand, in an engine operating region in which engine operation is carried out for a sufficiently long period of time, the corresponding learned value Gij is frequently updated, so the reliability of that learned value Gij increases.

The learned value Gij has a different value depending on the engine operating region; however, the learned value Gij in an engine operating region and the learned value Gmn in an adjacent different engine operating region have relatively close values.

According to the present embodiment, when the accumulated value D of the vehicle travel distance becomes the predetermined value Dth, in the case where the number of updates of the learned value Gij in the engine operating region is smaller than or equal to the first predetermined number of times N1 and the number of updates of the learned value Gmn is larger than or equal to a second predetermined number of times N2 in a different engine operating region adjacent to that engine operating region, the learned value Gmn in the different engine operating region is used as the learned value Gij in that engine operating region for update. Therefore, the learned value Gij in the corresponding engine operating region is updated with the learned value Gmn in the different engine operating region having a higher reliability.

With the above-described fuel injection control device for an internal combustion engine according the present embodiment, the following operation and advantageous effects are obtained. The electronic control unit 40 includes the fuel pressure sensor 41 that is provided for each fuel injection valve 20 and that detects the fuel pressure PQ inside the corresponding fuel injection valve 20. The learned value updating process in which the learned value Gij for compensating for the individual difference of each fuel injection valve 20 is updated at a predetermined learning rate on the basis of the fuel pressure PQ that is detected with the use of the corresponding fuel pressure sensor 41 is executed. Specifically, the corresponding fuel pressure sensor 41 is used to detect a manner of fluctuation of the fuel pressure PQ with the injection of fuel by each fuel injection valve 20, and then the tendency of deviation of an actual fuel injection characteristic with respect to a basic fuel injection characteristic of each fuel injection valve 20 is calculated on the basis of the result of comparison between the detected temporal waveform, which is the temporal waveform of a fuel injection rate that is calculated from the detected manner of fluctuation of the fuel pressure PQ, and a basic temporal waveform. At the time of updating the learned value Gij, the tendency of deviation is reflected at the predetermined reflection rate R. When the accumulated value D of the vehicle travel distance is shorter than the predetermined value Dth, the predetermined reflection rate R is increased as compared with when the accumulated value D is longer than or equal to the predetermined value Dth. By so doing, the learning rate of the learned value Gij is increased. With the above configuration, it is possible to desirably shorten a period during which the reliability of the learned value Gij of the corresponding fuel injection valve 20 is low immediately after the fuel injection valve 20 is assembled while basically updating the learned value Gij of the corresponding fuel injection valve 20 to an appropriate value by decreasing the learning rate of the learned value Gij. By changing the predetermined reflection rate R, it is possible to simply and accurately change the learning rate of the learned value Gij. In this case, in comparison with the configuration that an accumulated value of the number of updates of the learned value Gij is separately calculated, by using an existing parameter, that is, the accumulated value D of the vehicle travel distance, it is possible to reduce the processing load of the electronic control unit 40.

Furthermore, the learned value Gij is separately provided for each of the plurality of engine operating regions. In the learned value updating process, when the accumulated value D of the vehicle travel distance becomes the predetermined value Dth (reference value), in the case where the number of updates Nij of the learned value Gij in the engine operating region is smaller than or equal to the first predetermined number of times N1 and the number of updates Nmn of the learned value Gmn in a different engine operating region adjacent to that engine operating region is larger than or equal to the second predetermined number of times N2, the learned value Gmn in the different engine operating region is used as the learned value Gij in that engine operating region for update. With the above configuration, it is possible to update the learned value Gij of an engine operating region, for which engine operation has not been carried out so much at the time point at which the accumulated value D of the vehicle travel distance becomes the predetermined value Dth, to an appropriate value in a simple manner.

The fuel injection control device for an internal combustion engine according to the invention is not limited to the configuration illustrated in the above-described embodiment; it may be implemented, for example, in the following embodiment that is appropriately modified from the above embodiment.

In the above-described embodiment, the accumulated value of the number of updates of the learned value Gij is acquired on the basis of the accumulated value D of the vehicle travel distance. Instead, the accumulated value of the number of updates of the learned value Gij may be acquired on the basis of an accumulated value of an engine operation duration after each fuel injection valve 20 is assembled to the internal combustion engine 10.

The reference value according to the invention is not limited to the above-described predetermined value Dth, and may be, for example, set to a value smaller than the predetermined value Dth. In this case, it is possible to update the learned value Gij in an engine operating region, for which engine operation is not carried out so much, to an appropriate value earlier than the above-described embodiment.

In the above-described embodiment, when the accumulated value D of the vehicle travel distance becomes the predetermined value Dth, in the case where the number of updates Nij of the learned value Gij in the engine operating region is smaller than or equal to the first predetermined number of times N1 and the number of updates Nmn of the learned value Gmn in an adjacent different engine operating region is larger than or equal to the second predetermined number of times N2, the learned value Gmn in the adjacent different engine operating region is used as the learned value Gij for update. However, the invention is not limited to this configuration. The learned value Gij in the engine operating region may be updated on the basis of a learned value in a different engine operating region that is not adjacent to that engine operating region. In this case, it is desirable to correct the learned value in the non-adjacent different engine operating region with the use of a correction coefficient that is set on the basis of the relationship between the two engine operating regions.

In the learned value updating process according to the above-described embodiment, the corresponding fuel pressure sensor 41 is used to detect a manner of fluctuation of the fuel pressure PQ with the injection of fuel by each fuel injection valve 20, and then the tendency of deviation of an actual fuel injection characteristic with respect to a basic fuel injection characteristic of each fuel injection valve 20 is calculated on the basis of the result of comparison between the detected temporal waveform, which is the temporal waveform of a fuel injection rate that is calculated from the detected manner of fluctuation of the fuel pressure PQ, and a basic temporal waveform. A mode of calculating the tendency of deviation of an actual fuel injection characteristic with respect to a basic fuel injection characteristic of each fuel injection valve is not limited to this configuration. Another mode may be employed.

The invention claimed is:

1. A fuel injection control device for an internal combustion engine that includes a plurality of fuel injection valves that directly injects fuel into a cylinder, respectively, and a fuel pressure sensor that is provided for each fuel injection valve and detects a fuel pressure inside each fuel injection valve or in a system that supplies fuel to the fuel injection valve, the fuel injection control device comprising:
   an electronic control unit configured to execute a learned value updating process, the learned value updating process updating a learned value for compensating for an individual difference of each fuel injection valve at a predetermined learning rate on the basis of the fuel pressure that is detected by each fuel pressure sensor,
   the electronic control unit configured to execute the learned value updating process by increasing a learning rate of the learned value when an accumulated value of the number of updates of the learned value after the fuel injection valve is assembled to the internal combustion engine is smaller than a predetermined value as compared with when the accumulated value is larger than or equal to the predetermined value,
   the electronic control unit configured to provide the learned value separately for each of a plurality of engine operating regions,
   the electronic control unit configured to execute the learned value updating process by updating the learned value in a first engine operating region on the basis of the learned value in a second engine operating region different from the first engine operating region, on a condition that the accumulated value of the number of updates of the learned value in the first engine operating region becomes the predetermined value or a value smaller than the predetermined value, the number of updates of the learned value in the first engine operating region is smaller than or equal to a first predetermined number of times and the number of updates of the learned value in the second engine operating region is larger than or equal to a second predetermined number of times larger than the first predetermined number of times, and
   the electronic control unit configured to actuate the fuel injection valves based on the learned values.

2. The fuel injection control device according to claim 1, wherein
   the electronic control unit is configured to execute the learned value updating process by determining a tendency of deviation of an actual fuel injection characteristic of the fuel injection valve with respect to a basic fuel injection characteristic of the fuel injection valve on the basis of the fuel pressure that is detected by the fuel pressure sensor, utilizing the tendency of deviation at a predetermined rate at the time of updating the learned value, and increasing the predetermined rate when the accumulated value of the number of updates of the learned value is smaller than the predetermined value as compared with when the accumulated value is larger than or equal to the predetermined value.

3. The fuel injection control device according to claim 2, wherein
the electronic control unit is configured to execute the learned value updating process by detecting a manner of fluctuation of the fuel pressure with injection of fuel by the fuel injection valve with the use of the fuel pressure sensor and determining the tendency of deviation on the basis of a result of comparison between a basic temporal waveform and a detected temporal waveform that is a temporal waveform of a fuel injection rate that is determined from the detected manner of fluctuation of the fuel pressure.

4. The fuel injection control device according to claim 1, wherein
the electronic control unit is configured to execute the learned value updating process by updating the learned value in the first engine operating region with the learned value in the second engine operating region adjacent to the first engine operating region, on the condition that the accumulated value of the number of updates of the learned value becomes the predetermined value or the value smaller than the predetermined value, the number of updates of the learned value in the first engine operating region is smaller than or equal to the first predetermined number of times and the number of updates of the learned value in the second engine operating region is larger than or equal to the second predetermined number of times.

5. The fuel injection control device according to claim 1, wherein the internal combustion engine is mounted on a vehicle, and
the electronic control unit, in an alternative mode, is configured to estimate the accumulated value of the number of updates of the learned value on the basis of an accumulated value of a vehicle travel distance after the fuel injection valve is assembled to the internal combustion engine when the accumulated value of the vehicle travel distance is greater than or equal to the predetermined value.

6. A fuel injection control method for an internal combustion engine that includes an electronic control unit and a fuel injection valve that directly injects fuel into a cylinder, the fuel injection control method comprising:
updating, by the electronic control unit, a learned value for compensating for an individual difference of the fuel injection valve at a predetermined learning rate on the basis of a fuel pressure inside the fuel injection valve or in a system that supplies fuel to the fuel injection valve;
increasing, by the electronic control unit, the learning rate of the learned value when an accumulated value of the number of updates of the learned value after the fuel injection valve is assembled to the internal combustion engine is smaller than a predetermined value as compared with when the accumulated value is larger than or equal to the predetermined value;
acquiring, by the electronic control unit, the learned value for each of a plurality of engine operating regions; and
actuating, by the electronic control unit, the fuel injection valve based on the learned values, wherein
the learned value in a first engine operating region is updated on the basis of the learned value in a second engine operating region different from the first engine operating region, on a condition that the accumulated value of the number of updates of the learned value in the first engine operating region becomes the predetermined value or a value smaller than the predetermined value, the number of updates of the learned value in the first engine operating region is smaller than or equal to a first predetermined number of times and the number of updates of the learned value in the second engine operating region is larger than or equal to a second predetermined number of times larger than the first predetermined number of times.

7. The fuel injection control method according to claim 6, wherein
a tendency of deviation of an actual fuel injection characteristic of the fuel injection valve with respect to a basic fuel injection characteristic of the fuel injection valve is determined on the basis of the fuel pressure, the tendency of deviation is utilized at a predetermined rate at the time of updating the learned value, and the predetermined rate is increased when the accumulated value of the number of updates of the learned value is smaller than the predetermined value as compared with when the accumulated value is larger than or equal to the predetermined value.

8. The fuel injection control method according to claim 7, wherein
a manner of fluctuation of the fuel pressure with injection of fuel by the fuel injection valve is detected, and the tendency of deviation is determined on the basis of a result of comparison between a basic temporal waveform and a detected temporal waveform that is a temporal waveform of a fuel injection rate determined from the detected manner of fluctuation of the fuel pressure.

9. The fuel injection control method according to claim 6, wherein
the learned value in the first engine operating region is updated with the learned value in the second engine operating region adjacent to the first engine operating region, on the condition that the accumulated value of the number of updates of the learned value becomes the predetermined value or the value smaller than the predetermined value, the number of updates of the learned value in the first engine operating region is smaller than or equal to the first predetermined number of times and the number of updates of the learned value in the second engine operating region is larger than or equal to the second predetermined number of times.

10. The fuel injection control method according to claim 6 in which the internal combustion engine is mounted on a vehicle, wherein
the accumulated value of the number of updates of the learned value is estimated on the basis of an accumulated value of a vehicle travel distance after the fuel injection valve is assembled to the internal combustion engine.

* * * * *